United States Patent
DeMarco et al.

(10) Patent No.: US 6,195,200 B1
(45) Date of Patent: Feb. 27, 2001

(54) HIGH POWER MULTIWAVELENGTH LIGHT SOURCE

(75) Inventors: John Joseph DeMarco, East Brunswick; Justin Boyd Judkins, Scotch Plains; Paul Francis Wysocki, Flemington, all of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/025,465

(22) Filed: Feb. 18, 1998

(51) Int. Cl.$^7$ .................... H01S 3/30; G02B 6/26; G01C 19/72
(52) U.S. Cl. .................... 359/341; 359/180; 359/188; 359/333; 359/347; 372/6
(58) Field of Search .................... 359/333, 341, 359/347, 180, 188; 372/6

(56) References Cited

U.S. PATENT DOCUMENTS

| | | | |
|---|---|---|---|
| 4,063,106 | * 12/1977 | Ashkin et al. | 363/170 |
| 4,637,025 | * 1/1987 | Snitzer et al. | 372/6 |
| 4,938,556 | * 7/1990 | Digonnet et al. | 359/341 |
| 5,177,562 | * 1/1993 | Wysocki et al. | 372/29 |
| 5,189,676 | * 2/1993 | Wysocki et al. | 372/23 |
| 5,311,603 | * 5/1994 | Fidric | 385/11 |
| 5,453,836 | * 9/1995 | Kim et al. | 372/6 |
| 5,875,203 | * 2/1999 | Wagener et al. | 372/32 |

FOREIGN PATENT DOCUMENTS 0 3703 * 3/1991 (WO).

OTHER PUBLICATIONS

DeSurvire E.; Erbium Doped Fiber Amplifiers, Publ. John Wiley & Sons, ISBN 0–471–58977–2, pp. 318, 319, 462, 463, 514, 515, 1994.*

* cited by examiner

Primary Examiner—Nelson Moskowitz
(74) Attorney, Agent, or Firm—Mathews, Collins, Shepherd & Gould, P.A.

(57) ABSTRACT

In accordance with the invention, a multiwavelength light source comprises a length of optical waveguide amplifier, a multiwavelength reflector for reflecting a plurality of different spectrally separated wavelengths optically coupled to one side of the amplifier and a low reflection output coupled to the other side. A broadband source is provided for passing broadband light to the multiwavelength reflector. In the preferred embodiment, the reflector is a plurality of reflective Bragg gratings, the waveguide amplifier is a length of rare-earth doped fiber (e.g. EDF) and the broadband source is the amplifier pumped to generate ASE. In operation, broadband light is transmitted to the gratings. Light of wavelength channels corresponding to the reflection wavelengths of the gratings is reflected back through the amplifier for further amplification before it arrives at the output. Optionally one or more transmission filters can be disposed between the reflector and the amplifier (or at the output) ASE source to control the relative magnitudes of the selected channels.

8 Claims, 4 Drawing Sheets

HIGH POWER MULTIWAVELENGTH LIGHT SOURCE

FIELD OF THE INVENTION

This invention relates to light sources and, in particular, to a high power multiwavelength light source particularly useful in connection with wavelength division multiplexed (WDM) optical communication systems.

BACKGROUND OF THE INVENTION

Multiwavelength light sources are highly useful for testing WDM optical communication systems and components and as light sources for such systems. A multiwavelength light source is a light source which emits light in a plurality of spectrally spaced apart wavelength channels. In WDM optical communications system, an optical fiber simultaneously carries many different communications channels in light of respectively different wavelengths. Typically 8, 16 or 32 different wavelength signals propagate through the system. In testing WDM systems, components and test equipment, test sources are needed which produce light in the specific channels of the systems.

Typical multiwavelength sources utilize separate sources, such as ECL lasers, for each channel. The separate channels are generated one at a time and then combined to generate a multiwavelength source. This approach is expensive and inefficient.

Researchers have tried to generate multiwavelength sources by creating several very short lasers in a single piece of erbium doped fiber (EDF). This approach has proved inefficient and produces unstable lasers.

Others have used polarization inhomogeniety or spectral inhomogeniety in combination with wavelength selective elements to make an EDF laser with multiple laser wavelengths. But no truly stable, easily manufactured source has been found.

In yet other attempts, broadband light has been generated in EDF by amplified spontaneous emission (ASE) and, by means of filters, divided into several spectral bands. However, such sources produce poor power output in each channel because much of the power generated in the ASE source is between channels and is lost. Accordingly there is a need for an efficient, inexpensive multiwavelength light source.

SUMMARY OF THE INVENTION

In accordance with the invention, a multiwavelength light source comprises a length of optical waveguide amplifier, a multiwavelength reflector for reflecting a plurality of different spectrally separated wavelengths optically coupled to one side of the amplifier and a low reflection output coupled to the other side. A broadband source is provided for passing broadband light to the multiwavelength reflector. In the preferred embodiment, the reflector is a plurality of reflective Bragg gratings, the waveguide amplifier is a length of rare-earth doped fiber (e.g. EDF) and the broadband source is the amplifier pumped to generate ASE. In operation, broadband light is transmitted to the gratings. Light of wavelength channels corresponding to the reflection wavelengths of the gratings is reflected back through the amplifier for further amplification before it arrives at the output. Optionally one or more transmission filters can be disposed between the reflector and the amplifier (or at the output) ASE source to control the relative magnitudes of the selected channels.

BRIEF DESCRIPTION OF THE DRAWINGS

The advantages, nature and various additional features of the invention will appear more fully upon consideration of the illustrative embodiments now to be described in detail in connection with the accompanying drawings. In the drawings.

It is to be understood that these drawings are for illustrating the concepts of the invention and, except for graphs, are not to scale.

DETAILED DESCRIPTION

Figure 1:
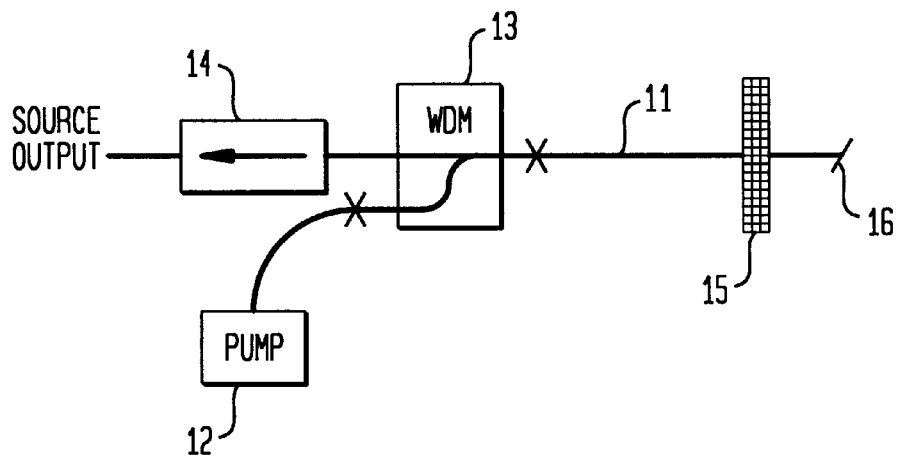
FIG. 1 is a schematic diagram of a multiwavelength light source in accordance with the invention.

Referring to the drawings, FIG. 1 schematically illustrates a multiwavelength light source 10 comprising a length of optical waveguide 11 including an optical amplifier such as a length of rare-earth doped fiber (e.g. such as EDF). One end of the waveguide amplifier is coupled to a multiwavelength reflector 15 such as an array of reflective filters. Conveniently, this is a linear array of reflective Bragg gratings formed in the waveguide 11 by techniques well known in the art. The reflective gratings reflect light at respectively different wavelengths. The reflected wavelength spectra of the reflective filters are chosen to define the wavelength spectra of the desired output channels for the multiwavelength source. Such spectra are determined, for example, by the spacing between successive perturbations of a Bragg grating. After the reflector 15, the waveguide 11 is provided with a nonreflective termination 16. The other end of the waveguide amplifier is conveniently provided with a sufficiently low reflection output 14 that lasing does not occur at the reflected wavelengths.

The device also requires a source of broadband light. In the preferred embodiment broadband light is provided by coupling the amplifier waveguide 11 to a pumping source 12 such as a semiconductor diode laser to form an ASE source. Coupling can be effected using a WDM 13 which couples pumping light into waveguide 11 and couples light from waveguide 11 to source output 14.

In operation of the preferred embodiment, pump light from pump 12 couples via WDM 13 into EDF fiber 11. As a consequence, broadband ASE is generated, propagating in both directions. When the ASE propagating toward array 15 reaches the reflective gratings, channels corresponding to the filter reflection spectra are reflected back for a second pass through the pumped EDF fiber. Non-reflected light is dissipated in the termination 16.

The channels appear at the source output 14 where, because of their second pass through the EDF, they are much greater in intensity (approximately 20 dB greater) than the broadband ASE that propagates toward the output.

This device provides an inexpensive, versatile multiwavelength source which can be used to test WDM systems and components. It can also be divided into separate channels which can be individually modulated for use as a source of WDM system signals. Advantages of the device include:

(a) high overall output power;
(b) concentration of the power at specific channel wavelengths;
(c) high sideband rejection (little power located between channels);
(d) channel bandwidth can be easily controlled;
(e) channel powers can be compensated;
(f) few components, low complexity and low cost; and
(g) wavelengths can be easily reconfigured.

Experimental results show variation in the output power of different channels of about 8 dB. This is attributable in large part to the spectral dependence of EDF and can be compensated by disposing a transmission filter in the path of the second pass channels.

Figure 2:
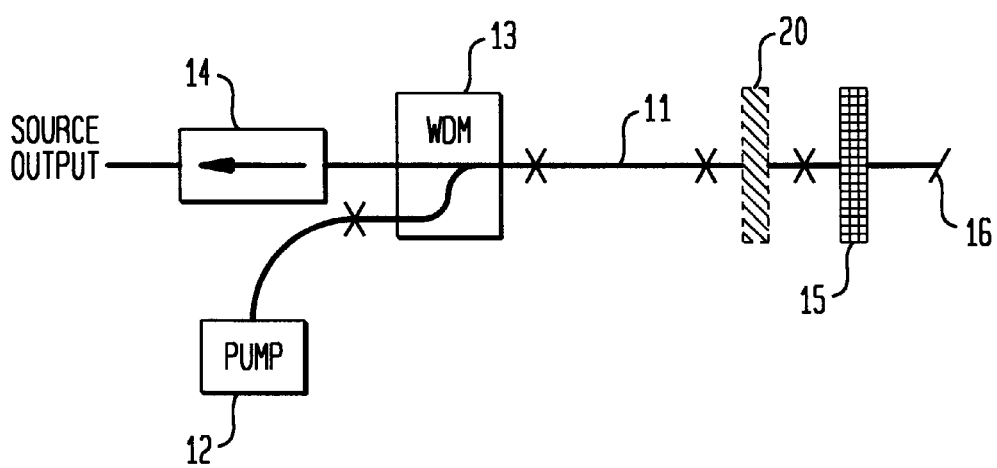
FIG. 2 illustrates an alternative form of the FIG. 1 embodiment including a transmission filter to control the relative magnitudes of the selected channels.

FIG. 2 illustrates an alternative form of the FIG. 1 device wherein a transmission filter 20 is disposed in the path of the reflected channels for equalizing the power in the channels.

Figure 3:
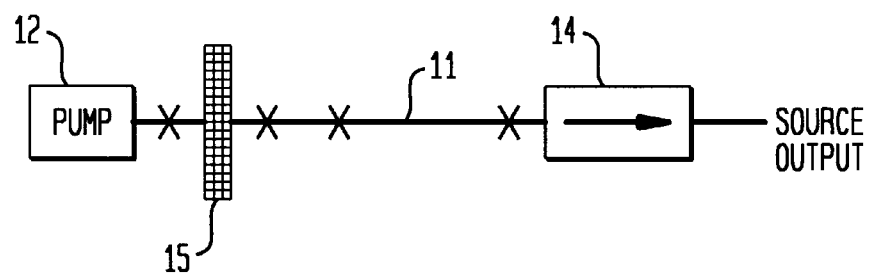
FIG. 3 is a schematic diagram of a third embodiment of the invention wherein the pump is coupled directly to the device fiber.

In the FIG. 1 embodiment the multiwavelength reflector 15 is near the end of the EDF opposite the pump 12. FIG. 3 shows an alternative embodiment wherein the pump 12 is near the same end of the EDF as the reflector 15. In operation, the pump light passes through reflector 15 to pump the EDF. Broad band ASE from the EDF impinges upon reflector 15 and selected channels are reflected for a second pass through the EDF to source output 14.

Figure 4:
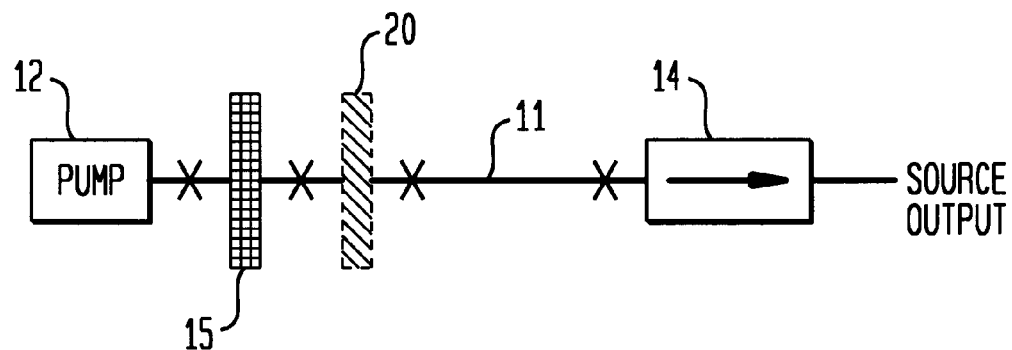
FIG. 4 illustrates an alternative form of the FIG. 3 embodiment including a transmission filter.

FIG. 4 illustrates a variation of the FIG. 3 embodiment including a transmission filter 20 to equalize the second pass channels.

Figure 5:
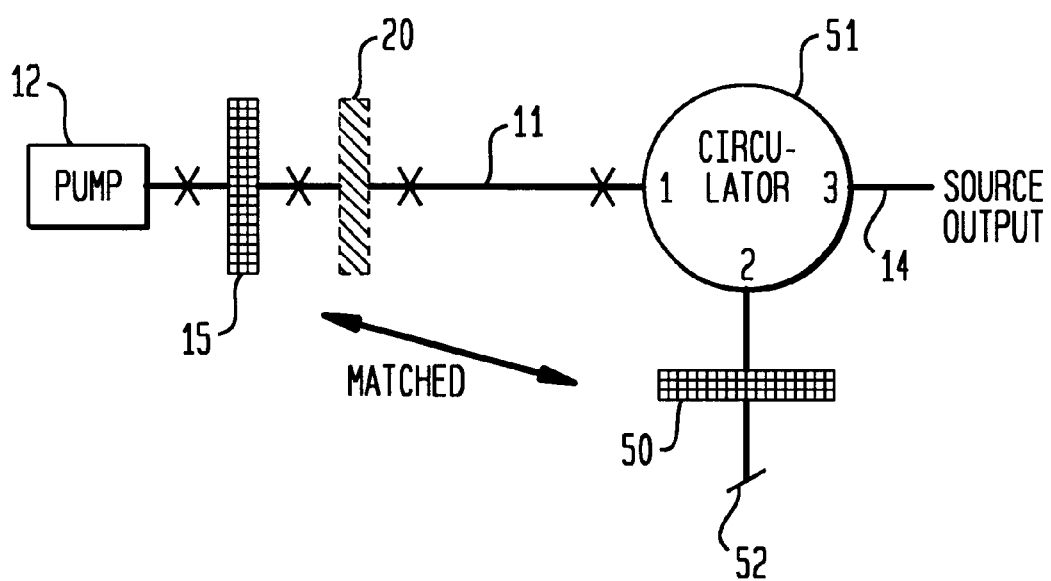
FIG. 5 shows yet another embodiment of the invention using a circulator and a plurality of matched reflective filter sets to further reduce the out-of-channel power.

FIG. 5 shows yet a third embodiment of a multiwavelength source wherein a second multiwavelength reflector 50 in combination with a circulator 51 is used to reduce even further the power outside the channels. Preferably the reflector 50 is an array of Bragg gratings matched to those of reflector 15. In operation, second pass channels reflected from reflector 15 along with single pass ASE enter the circulator at port 1. At port 2 the channels are reflected by reflector 50, with the bulk of the ASE dissipated at termination 52. The reflected channels pass to port 3 and then to the source output 14. This further reduces the out-of-channel power.

The invention can now be better understood by reference to the following specific example.

EXAMPLE 16 channel multiwavelength light sources were constructed in accordance with FIGS. 3 and 4, respectively. The pump source was a 1480 nm semiconductor diode laser. The EDF fiber was a 14 m length MP980 fiber marketed by Lucent Specialty Fiber Devices (silica based fiber with 10 molar % aluminum and sufficient erbium to produce 6 dB/m peak absorption near 1530 nm). Reflective gratings provided 16 wavelengths spaced 2 nm apart between 1530 nm and 1560 nm. The output power was about 5 mW in the 16 channels at the highest power. The variation among channels was about 8 dB in the unfiltered case but was reduced to about 4 dB using the filtered version. Each channel had a 0.5 nm width.

Figure 6:
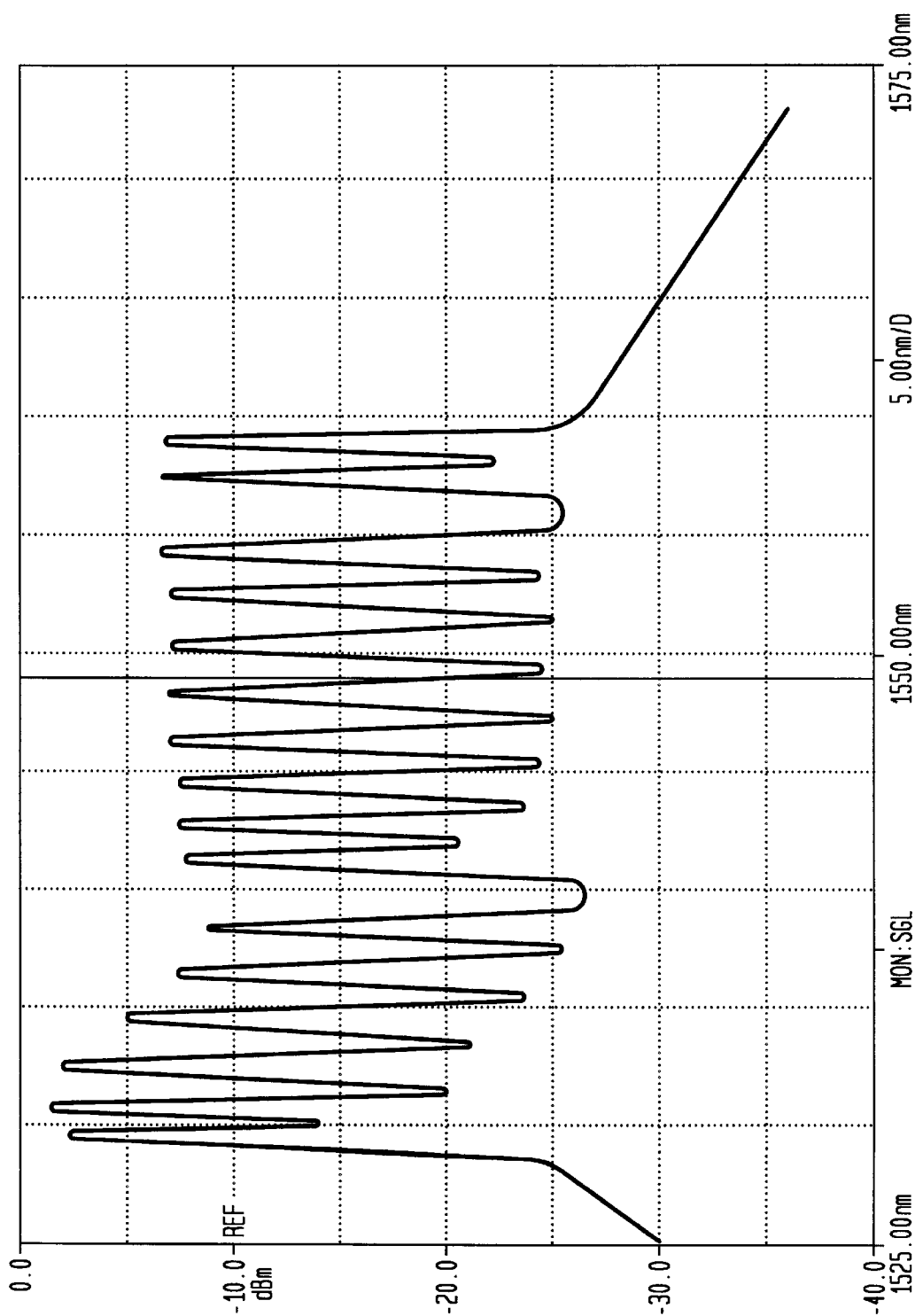
FIG. 6 is a graphical illustration showing the output of a typical device according to FIG. 3.
Figure 7:
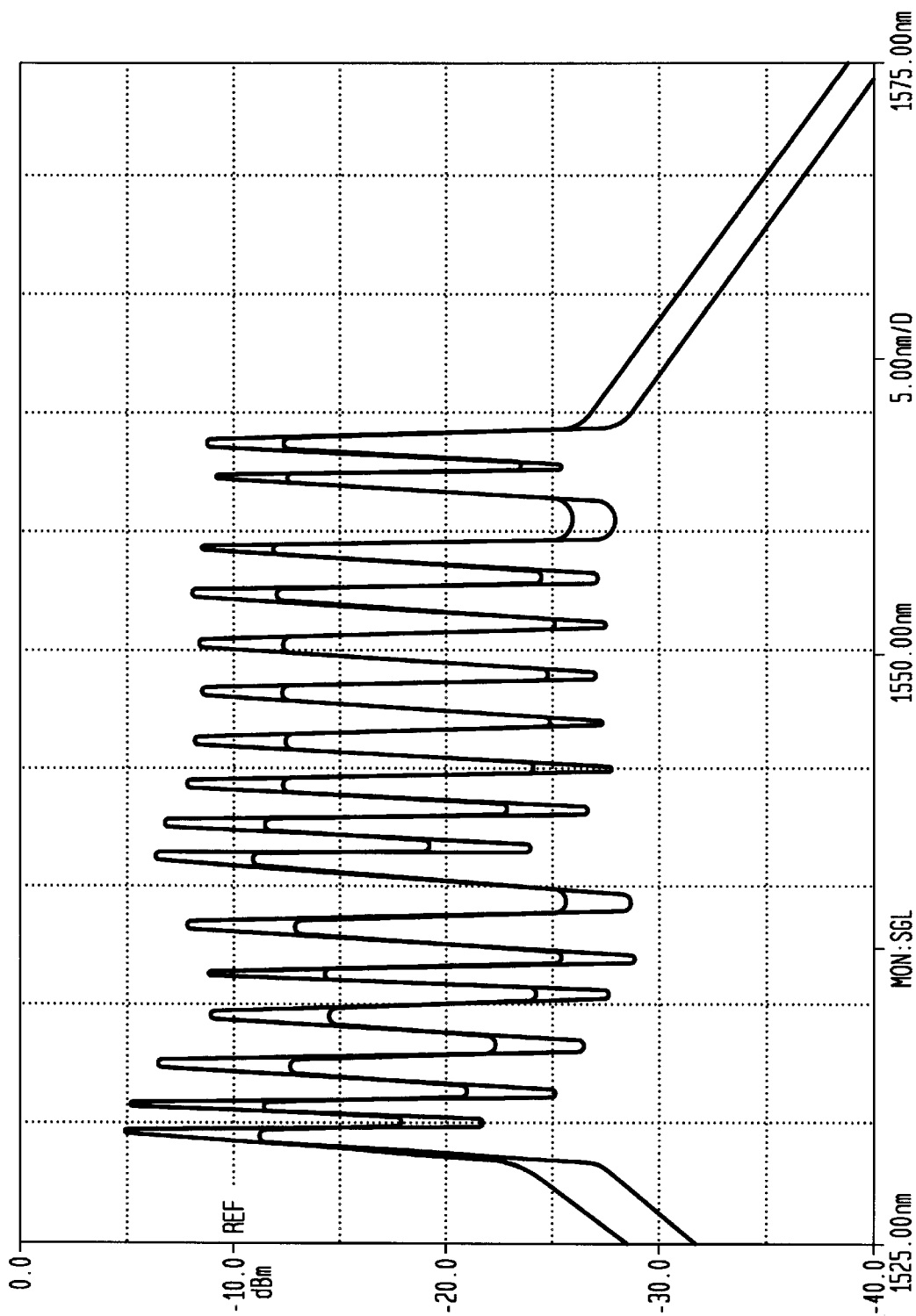
FIG. 7 illustrates the output of a typical device according to FIG. 4.

FIG. 6 is a graphical illustration showing the output of the unfiltered device. FIG. 7 shows the output of the filtered device.

There are many alternative embodiments which can operate on the same principle. For example, broad band light can be provided by a separate EDF or by a white light source other than one generating ASE. The external broadband light can be passed into the device through the output port for selective double pass reflection, as by use of a circulator.

While the multiwavelength reflector has been described as an array of reflective Bragg grating devices for reflecting respectively different wavelengths, it can also be a single device, such as a Fabry-Perot interferometer, that reflects a plurality of different, spectrally separated wavelengths.

Filters for flattening the output can be placed either at the output of the device or, as shown in FIGS. 2 and 4, next to the reflectors. Filtering at the reflector is preferred because it does not waste power, but output filtering is still possible.

The narrowband reflections at one end of the EDF can be separated by other components such as loss elements (transmissive filters) to create a wavelength dependent reflection or the multiple reflectors could be interleaved with pieces of EDF.

Thus a multiwavelength light source in accordance with the invention comprises a length optical waveguide amplifier, a multiwavelength reflector coupled to one end of the waveguide amplifier for reflecting light at a plurality of different, spectrally separated wavelengths into the amplifier, and, coupled to the other end of the amplifier, an output that is sufficiently low in reflection that the device does not act as a resonant laser for receiving reflected light passing through the amplifier. The result is a multiwavelength source with outputs corresponding to the wavelengths of the reflector.

It is to be understood that the above-described embodiments are illustrative of only a few of the many possible specific embodiments which can represent applications of the principles of the invention. Numerous and varied other arrangements can be readily devised by those skilled in the art without departing from the spirit and scope of the invention.

What is claimed:

1. A multiwavelength light source comprising:

a length of optical waveguide amplifier;

a multiwavelength reflector coupled to one end of said waveguide amplifier for reflecting light at a plurality of different, spectrally separated wavelengths into said amplifier;

a source of broadband light for directing broadband light onto said optical reflector, whereby said reflector reflects light at said different, spectrally separated wavelengths through said optical waveguide amplifier; and coupled to said waveguide amplifier an output for receiving amplified light at said different wavelengths from said amplifier, said output having sufficiently low reflectance that the device does not act as a resonant laser for said different wavelengths, said output providing light in a plurality of wavelength channels spectrally separated by sideband rejection of at least 10 dB between successive channels.

2. The light source of claim 1 wherein said multiwavelength reflector comprises a plurality of Bragg reflectors.

3. The light source of claim 1 wherein said length of optical waveguide amplifier comprises a length of rare earth-doped fiber.

4. The light source of claim 1 wherein said length of optical waveguide amplifier comprises a length of erbium doped fiber.

5. The light source of claim 1 wherein said source of broadband light is a source of amplified spontaneous emission.

6. The light source of claim 3 wherein said waveguide amplifier comprises a semiconductor diode laser pumping source.

7. The light source of claim 1 further comprising a transmission filter for reducing differences in the level of power of among said reflected wavelengths.

8. The light source of claim 1 wherein each wavelength channel of said plurality has a channel bandwidth of 0.5 nm or less.

* * * * *